(12) United States Patent
Ferris et al.

(10) Patent No.: US 9,025,273 B1
(45) Date of Patent: May 5, 2015

(54) DISK DRIVE EMPLOYING DIGITAL ACCUMULATORS TO LIMIT VELOCITY AND/OR ACCELERATION OF MICROACTUATOR

(71) Applicant: Western Digital Technologies, Inc., Irvine, CA (US)

(72) Inventors: Timothy A. Ferris, Mission Viejo, CA (US); Joseph J. Crowfoot, Costa Mesa, CA (US)

(73) Assignee: Western Digital Technologies, Inc., Irvine, CA (US)

( * ) Notice: Subject to any disclaimer, the term of this patent is extended or adjusted under 35 U.S.C. 154(b) by 0 days.

(21) Appl. No.: 14/052,666

(22) Filed: Oct. 11, 2013

Related U.S. Application Data

(60) Provisional application No. 61/870,847, filed on Aug. 28, 2013.

(51) Int. Cl.
*G11B 5/54* (2006.01)
*G11B 21/02* (2006.01)
*G11B 5/588* (2006.01)
*G11B 15/473* (2006.01)

(52) U.S. Cl.
CPC .............. *G11B 21/02* (2013.01); *G11B 5/588* (2013.01); *G11B 15/473* (2013.01)

(58) Field of Classification Search
CPC .......... G11B 5/54; G11B 5/5552; G11B 5/56; G11B 5/588; G11B 15/473
USPC ............... 360/55, 69, 73.01, 75, 77.01, 78.06
See application file for complete search history.

(56) References Cited

U.S. PATENT DOCUMENTS

| | | | |
|---|---|---|---|
| 4,190,860 A * | 2/1980 | Somers et al. ................ 369/240 |
| 5,329,409 A * | 7/1994 | Hampshire ................ 360/77.02 |
| 5,548,569 A * | 8/1996 | Shimizume et al. ....... 369/44.28 |
| 6,118,739 A * | 9/2000 | Kishinami et al. ......... 369/44.28 |
| 6,249,496 B1 * | 6/2001 | Tsukahara et al. ......... 369/44.28 |
| 6,285,521 B1 * | 9/2001 | Hussein .................... 360/73.03 |
| 6,590,734 B1 | 7/2003 | Ell |
| 7,038,876 B2 | 5/2006 | Morris |
| 7,126,776 B1 * | 10/2006 | Warren et al. ................... 360/51 |
| 7,173,790 B2 | 2/2007 | Kobayashi et al. |
| 7,595,956 B2 | 9/2009 | Guo et al. |
| 7,656,607 B1 | 2/2010 | Bennett |
| 7,697,233 B1 | 4/2010 | Bennett et al. |
| 8,232,790 B2 | 7/2012 | Leong et al. |
| 2005/0128633 A1 * | 6/2005 | Hosokawa ...................... 360/75 |

* cited by examiner

*Primary Examiner* — Thomas Alunkal

(57) ABSTRACT

A disk drive is disclosed comprising a microactuator configured to actuate a head over a disk, and control circuitry comprising a first digital accumulator responsive to a first register. The first digital accumulator generates at least one of a velocity command and a position command for the microactuator, and the control circuitry configures the first register in order to limit at least one of a velocity and an acceleration of the microactuator.

19 Claims, 4 Drawing Sheets

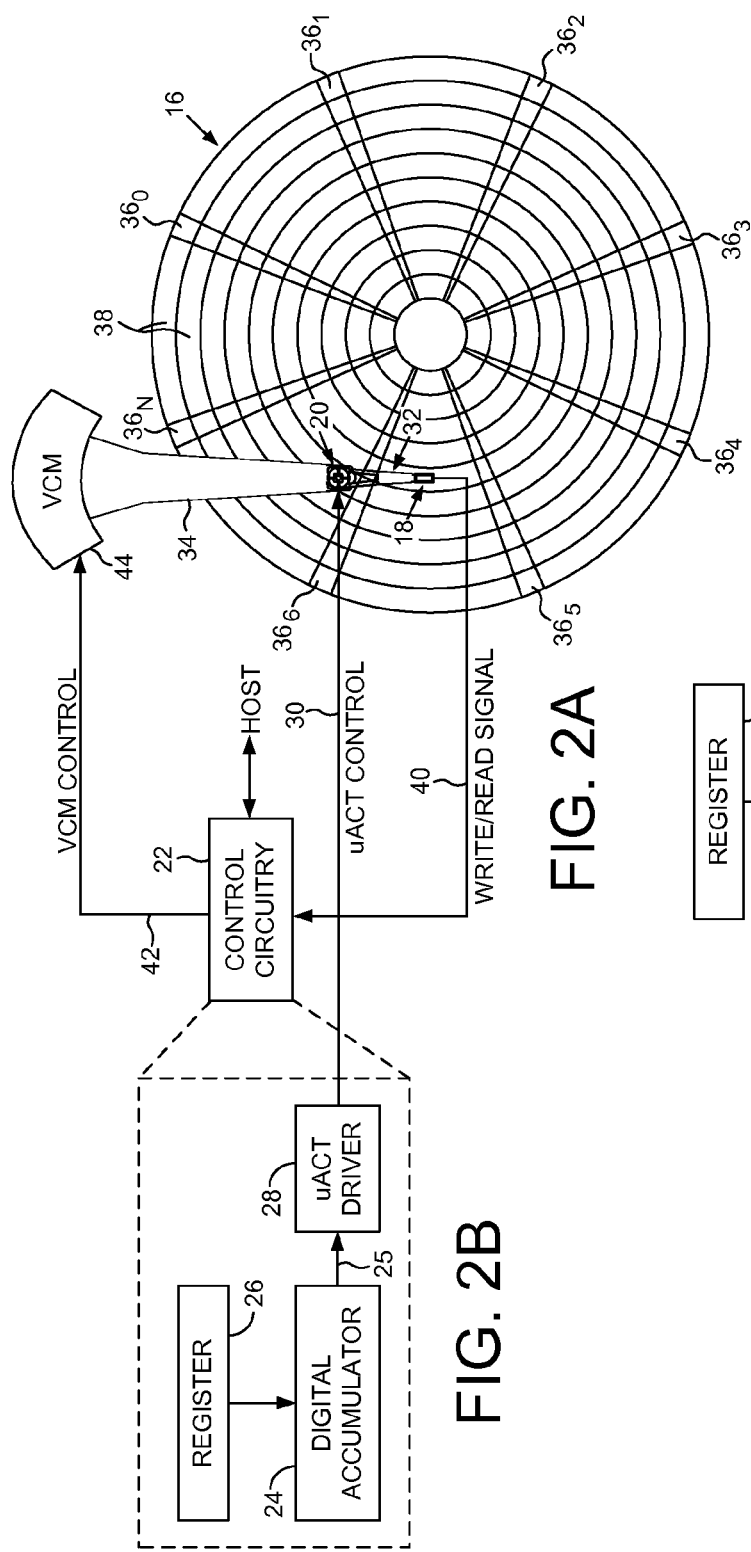

DISK DRIVE EMPLOYING DIGITAL ACCUMULATORS TO LIMIT VELOCITY AND/OR ACCELERATION OF MICROACTUATOR

CROSS-REFERENCE TO RELATED APPLICATIONS

This application claims priority to provisional U.S. Patent Application Ser. No. 61/870,847, filed on Aug. 28, 2013, which is hereby incorporated by reference in its entirety.

BACKGROUND

Disk drives comprise a disk and a head connected to a distal end of an actuator arm which is rotated about a pivot by a voice coil motor (VCM) to position the head radially over the disk. The disk comprises a plurality of radially spaced, concentric tracks for recording user data sectors and servo sectors. The servo sectors comprise head positioning information (e.g., a track address) which is read by the head and processed by a servo control system to control the actuator arm as it seeks from track to track.

FIG. 1 shows a prior art disk format 2 as comprising a number of servo tracks 4 defined by servo sectors $6_0$-$6_N$ recorded around the circumference of each servo track. Each servo sector $6_i$ comprises a preamble 8 for storing a periodic pattern, which allows proper gain adjustment and timing synchronization of the read signal, and a sync mark 10 for storing a special pattern used to symbol synchronize to a servo data field 12. The servo data field 12 stores coarse head positioning information, such as a servo track address, used to position the head over a target data track during a seek operation. Each servo sector $6_i$ further comprises groups of servo bursts 14 (e.g., N and Q servo bursts), which are recorded with a predetermined phase relative to one another and relative to the servo track centerlines. The phase based servo bursts 14 provide fine head position information used for centerline tracking while accessing a data track during write/read operations. A position error signal (PES) is generated by reading the servo bursts 14, wherein the PES represents a measured position of the head relative to a centerline of a target servo track. A servo controller processes the PES to generate a control signal applied to a head actuator (e.g., a voice coil motor) in order to actuate the head radially over the disk in a direction that reduces the PES.

BRIEF DESCRIPTION OF THE DRAWINGS

FIGS. 2A and 2B show a disk drive according to an embodiment comprising a head actuated over a disk by a voice coil motor (VCM) and a microactuator.

FIG. 2C shows a servo control system according to an embodiment comprising a digital accumulator for generating a control signal applied to the microactuator.

DETAILED DESCRIPTION

Figure 1:
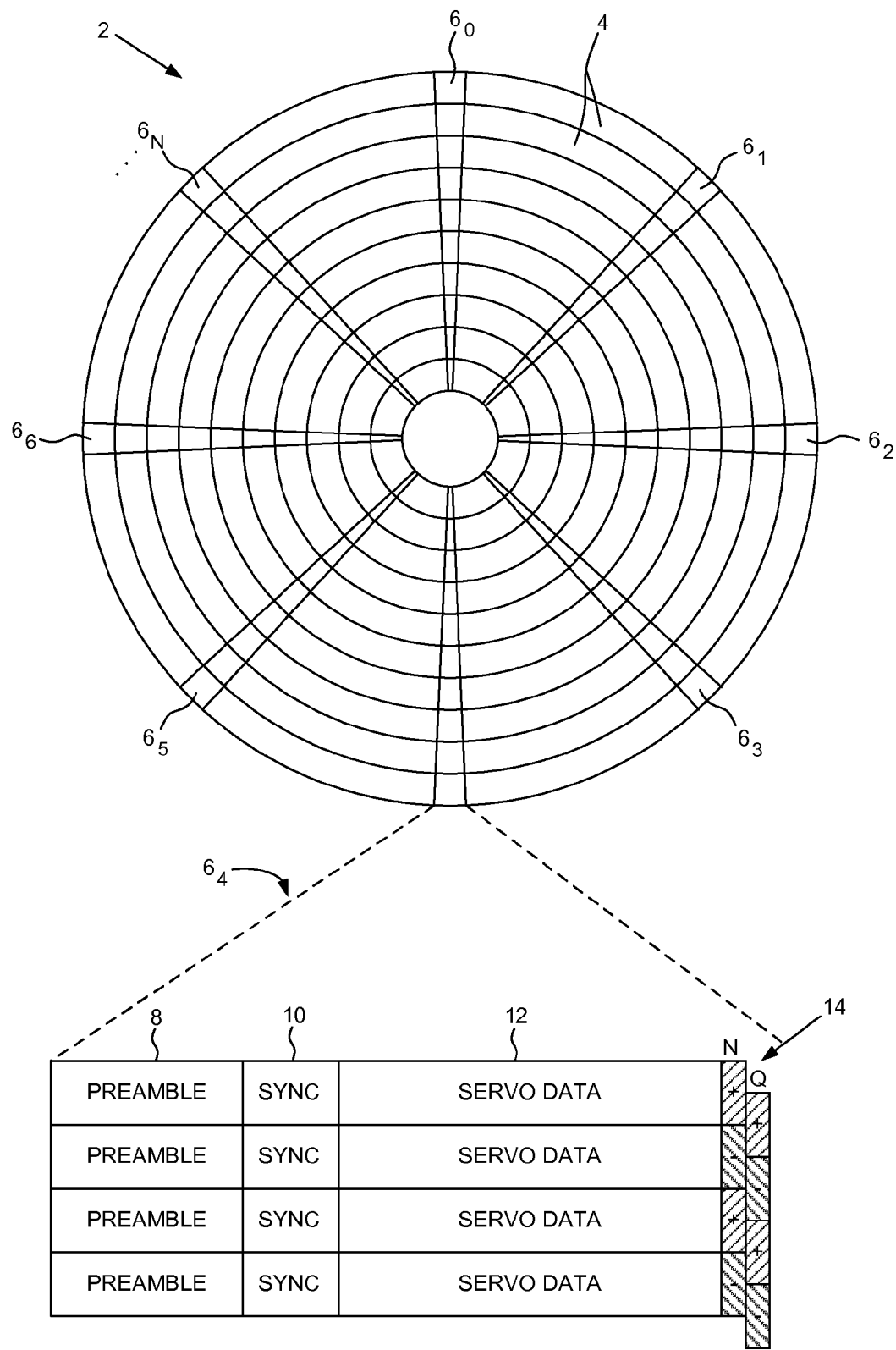
FIG. 1 shows a prior art disk format comprising a plurality of servo tracks defined by servo sectors.

FIGS. 2A and 2B show a disk drive according to an embodiment comprising a disk 16, a head 18, a microactuator 20 configured to actuate the head 18 over the disk 16, and control circuitry 22 comprising a first digital accumulator 24 responsive to a first register 26, wherein the first digital accumulator 24 is configured to generate at least one of a velocity command and a position command for the microactuator 20, and the control circuitry 22 is configured to program the first register 26 in order to limit at least one of a velocity and acceleration of the microactuator 20.

In the embodiment of FIG. 2B, the control signal 25 output by the first digital accumulator 24 is input into a suitable microactuator driver 28 which may comprise a digital-to-analog converter (DAC) for generating an analog control signal 30 applied to the microactuator 20. Any suitable microactuator 20 may be employed, such as a piezoelectric actuator, and the microactuator 20 may actuate the head 18 over the disk 16 in any suitable manner, such as by actuating a suspension 32 relative to an actuator arm 34, or actuating the head 18 relative to the suspension 32.

In the embodiment of FIG. 2A, the disk 16 comprises a plurality of servo sectors $36_0$-$36_N$ that define a plurality of servo tracks 38, wherein data tracks are defined relative to the servo tracks 38 at the same or different radial density (tracks per inch). The control circuitry 22 processes a read signal 40 emanating from the head 18 to demodulate the servo sectors $36_0$-$36_N$ and generate a position error signal (PES) representing an error between the actual position of the head and a target position relative to a target track. The control circuitry 22 processes the PES using a suitable servo control system to generate a control signal 42 applied to a voice coil motor (VCM) 44 which rotates the actuator arm 34 about a pivot in order to actuate the head 18 radially over the disk 16 in a direction that reduces the PES. In one embodiment, the VCM 44 is controlled to actuate the head 18 over the disk 16 in coarse movements while the microactuator 20 is controlled to actuated the head 18 over the disk 16 in fine movements. The servo sectors $36_0$-$36_N$ may comprise any suitable head position information, such as a track address for coarse positioning and servo bursts for fine positioning. The servo bursts may comprise any suitable pattern, such as an amplitude based servo pattern or a phase based servo pattern.

FIG. 2C shows a closed-loop servo control system according to an embodiment for controlling the microactuator 20. A measured position 46 of the head 18 is subtracted from a reference position 48 (which may be zero to represent the center of a target track) to generate a PES 50. A suitable compensator 52 processes the PES 50 such as by filtering the PES 50 using a suitable proportional-integral-derivative (PID) algorithm or any other suitable algorithm. The compensator 52 generates a command signal 54, which may be one or more of a position command, velocity command, or an acceleration command. Block 56 generates the control signal 30 applied to the microactuator 20 in response to a register 58 in a manner that limits at least one of a velocity and acceleration of the microactuator 20. In one embodiment, limiting the velocity and/or acceleration of the microactuator 20 may help reduce undesirable effects such as head/disk contact while still providing adequate servoing performance.

Figure 3A:
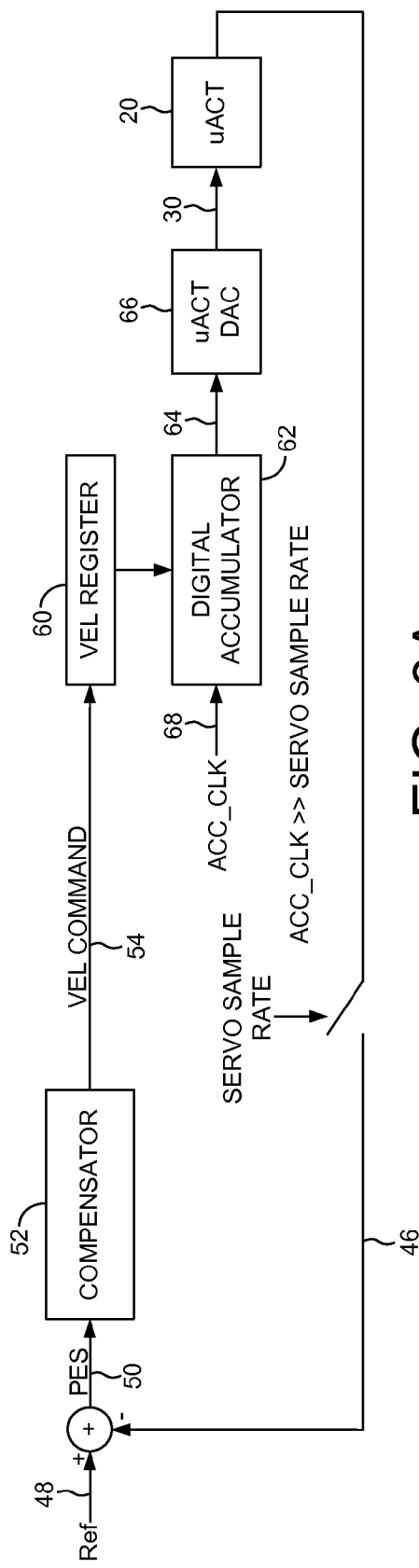
FIG. 3A shows a servo control system according to an embodiment wherein a register of the digital accumulator is programmed in order to limit a velocity of the microactuator.
Figure 3B:
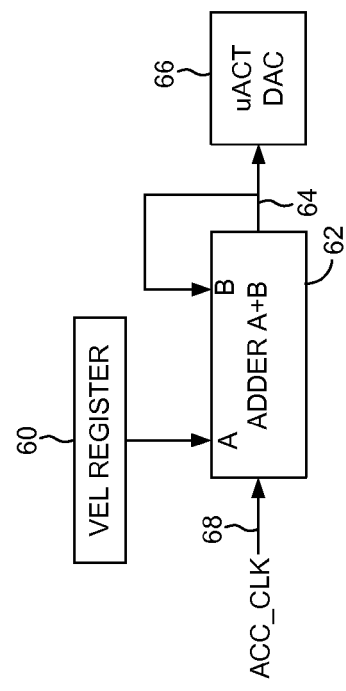
FIG. 3B shows an embodiment wherein the digital accumulator comprises an adder for accumulating a velocity command stored in a register.

FIG. 3A shows a closed-loop servo control system according to an embodiment wherein the compensator 52 generates a velocity command 54 in response to the PES 50. The velocity command 54 is stored in a register 60 which is accumulated by a digital accumulator 62 to generate a corresponding position command 64 (the integral of velocity is position). The position command 64 is applied to a microactuator DAC 66 to generate the analog control signal 30 applied to the microactuator 20. FIG. 3B shows an example embodiment for the digital accumulator 62 as comprising an adder for accumulating the velocity command 54 stored in register 60. In the embodiment of FIG. 3A, the position 46 of the head 18 is measured at each servo sector $36_0$-$36_N$ and therefore the PES 50 is updated at the servo sample rate. The digital accumulator 62, on the other hand, is clocked by an accumulator clock 68 (ACC_CLK) at a higher frequency than the servo sample rate. This embodiment enables fine control over the slew rate of the position command 64, thereby avoiding sharp velocity changes that may otherwise occur if the position command 64 were updated at the servo sample rate. In one embodiment, the higher the frequency used for the accumulator clock 68 the better fidelity in controlling the slew rate. For example, in one embodiment the frequency of the accumulator clock 68 may be at least twice as fast as the servo sample rate. In addition, the velocity command 54 generated by the compensator 52 and programmed into register 60 is based on the frequency of the accumulator clock 68, such that the faster the frequency of the accumulator clock 68 the smaller the corresponding velocity command 54.

Figure 4:
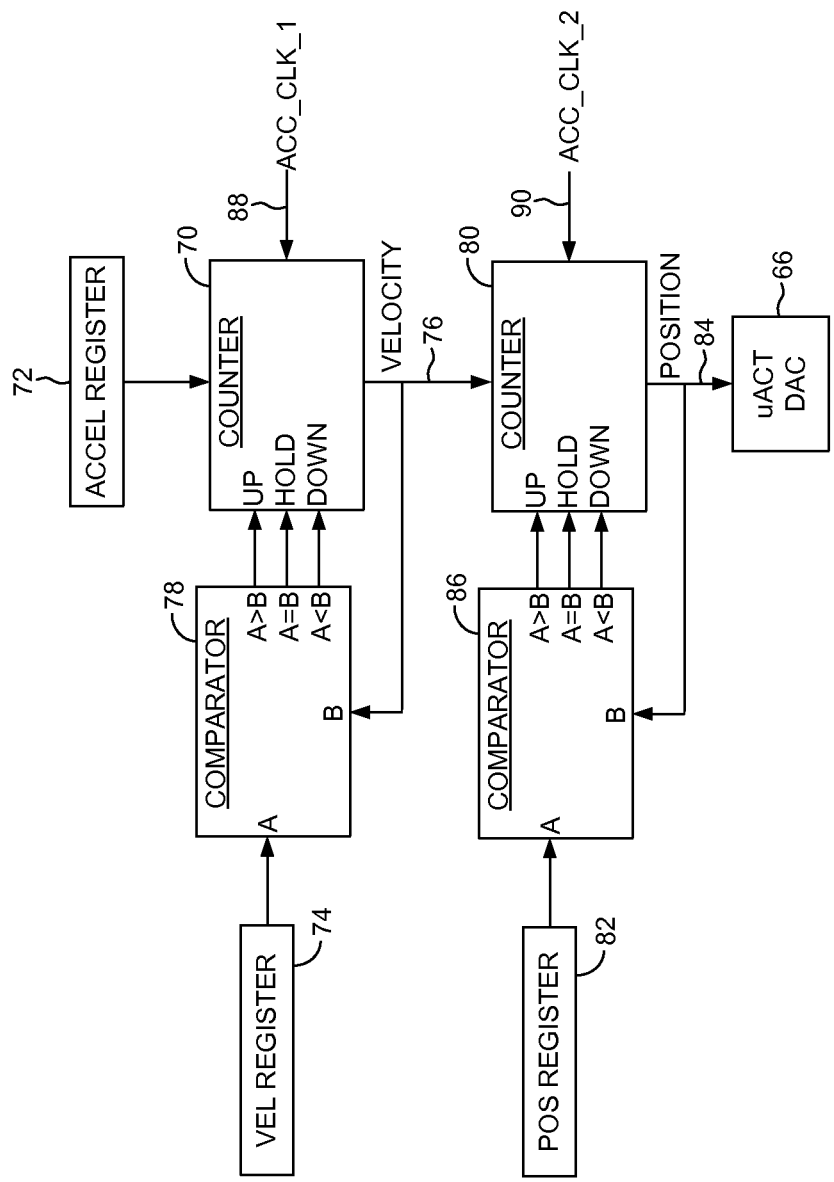
FIG. 4 shows a servo control system according to an embodiment wherein a first register of a first digital accumulator is programmed in order to limit an acceleration of the microactuator, and a second register of a second digital accumulator is programmed to limit a velocity of the microactuator.

FIG. 4 shows control circuitry according to an embodiment wherein digital accumulators may be used to limit the velocity and the acceleration of the microactuator 20. The control circuitry comprises a first digital accumulator in the form of a first counter 70 that counts based on a step value programmed into a first register 72 representing a limit on the acceleration. The control circuitry further comprises a second register 74 programmed with a velocity value for the microactuator, wherein the first counter 70 counts up when the output 76 of the first counter 70 (representing the velocity of the microactuator) is less than the velocity value 74 at comparator 78, and counts down when the output 76 is greater than the velocity value 74. The control circuitry further comprises a second digital accumulator in the form of a second counter 80 that counts based on the output 76 of the first counter 70 (representing the velocity of the microactuator), and a third register 82 programmed with a position value for the microactuator. The second counter 80 counts up when the output 84 of the second counter 80 (representing the position of the microactuator) is less than the position value 82 at comparator 86, and counts down when the output 84 is greater than the position value 82. The first counter 70 is clocked with a first accumulator clock 88 and the second counter 80 is clocked with a second accumulator clock 90 which may cycle at the same or different frequency than the first accumulator clock 88. In one embodiment, the frequency of the first and second accumulator clocks is greater than the servo sample rate similar to the embodiment of FIG. 3A.

The control circuitry may program the registers shown in FIG. 4 in any suitable manner. In one embodiment, the compensator 52 (FIG. 2) may generate a position command based on the PES 50, wherein the position command is programmed into the position register 82 of FIG. 4. In this embodiment, the control circuitry may program suitable values into the velocity register 74 and the acceleration register 72 in order to limit the velocity and acceleration of the microactuator (thereby limiting the slew rate of the position command 84 generated by the second counter 80). In another embodiment, the compensator 52 may generate a velocity command based on the PES 50, wherein the velocity command is programmed into the velocity register 74, the acceleration register 72 limits the acceleration, and the position register 82 limits the stroke of the microactuator. In yet another embodiment, the compensator 52 may generate an acceleration command based on the PES 50, wherein the acceleration command is programmed into the acceleration register 72, the velocity register 74 limits the velocity, and the position register 82 limits the stroke of the microactuator.

Any suitable control circuitry may be employed to implement the flow diagrams in the above embodiments, such as any suitable integrated circuit or circuits. For example, the control circuitry may be implemented within a read channel integrated circuit, in power integrated circuit, or in a disk controller, or certain operations described above may be performed by a read channel or power controller and others by a disk controller. In one embodiment, the read channel, power integrated circuit and disk controller may be implemented as separate integrated circuits, and in an alternative embodiment they are fabricated into a single integrated circuit or system on a chip (SOC). In addition, the control circuitry may include a suitable preamp circuit implemented as a separate integrated circuit, integrated into the read channel or disk controller circuit, or integrated into a SOC.

In one embodiment, the control circuitry comprises a microprocessor executing instructions, the instructions being configured to cause the microprocessor to perform the flow diagrams described herein. The instructions may be stored in any computer-readable medium. In one embodiment, they may be stored on a non-volatile semiconductor memory external to the microprocessor, or integrated with the microprocessor in a SOC. In another embodiment, the instructions are stored on the disk and read into a volatile semiconductor memory when the disk drive is powered on. In yet another embodiment, the control circuitry comprises suitable logic circuitry, such as state machine circuitry.

The various features and processes described above may be used independently of one another, or may be combined in various ways. All possible combinations and subcombinations are intended to fall within the scope of this disclosure. In addition, certain method, event or process blocks may be omitted in some implementations. The methods and processes described herein are also not limited to any particular sequence, and the blocks or states relating thereto can be performed in other sequences that are appropriate. For example, described tasks or events may be performed in an order other than that specifically disclosed, or multiple may be combined in a single block or state. The example tasks or events may be performed in serial, in parallel, or in some other manner. Tasks or events may be added to or removed from the disclosed example embodiments. The example systems and components described herein may be configured differently than described. For example, elements may be added to, removed from, or rearranged compared to the disclosed example embodiments.

While certain example embodiments have been described, these embodiments have been presented by way of example only, and are not intended to limit the scope of the inventions disclosed herein. Thus, nothing in the foregoing description is intended to imply that any particular feature, characteristic, step, module, or block is necessary or indispensable. Indeed, the novel methods and systems described herein may be embodied in a variety of other forms; furthermore, various omissions, substitutions and changes in the form of the methods and systems described herein may be made without departing from the spirit of the embodiments disclosed herein.

What is claimed is:

1. A disk drive comprising:
   a disk;
   a head;
   a microactuator configured to actuate the head over the disk; and
   control circuitry comprising a first digital accumulator responsive to a first register, wherein:
   the first digital accumulator is configured to generate at least one of a velocity command and a position command for the microactuator;
   the control circuitry is configured to program the first register in order to limit at least one of a velocity and an acceleration of the microactuator; and
   the first digital accumulator is further configured to integrate a first value based on the first register.

2. The disk drive as recited in claim 1, wherein the first digital accumulator is configured to integrate the first value based on the first register in order to generate the position command.

3. The disk drive as recited in claim 2, wherein the first value limits the velocity of the microactuator.

4. The disk drive as recited in claim 1, wherein the first digital accumulator is configured to integrate the first value based on the first register in order to generate the velocity command.

5. The disk drive as recited in claim 2, wherein the first value limits the acceleration of the microactuator.

6. The disk drive as recited in claim 1, wherein the first digital accumulator comprises a counter comprising a step value based on the first register.

7. The disk drive as recited in claim 1, wherein the disk comprises a plurality of tracks defined by embedded servo sectors and the control circuitry is further configured to:
   process the servo sectors at a servo sample rate; and
   clock the first digital accumulator at least twice as fast as the servo sample rate.

8. The disk drive as recited in claim 1, further comprising a second digital accumulator responsive to a second register, wherein the second digital accumulator is configured to generate the velocity command for the microactuator and the control circuitry is further configured to:
   configure the first register in order to limit the velocity of the microactuator; and
   configure the second register in order to limit the acceleration of the microactuator.

9. The disk drive as recited in claim 8, wherein:
   the second digital accumulator comprises a second counter comprising a second step value based on the second register; and
   the first digital accumulator comprises a first counter comprising a first step value based on an output of the second counter.

10. A method of operating a disk drive, the method comprising:
    configuring a first digital accumulator to generate at least one of a velocity command and a position command for a microactuator configured to actuate a head over a disk, wherein the first digital accumulator is responsive to a first register; and
    configuring the first register in order to limit at least one of a velocity and an acceleration of the microactuator,
    wherein the first digital accumulator integrates a first value based on the first register.

11. The method as recited in claim 10, wherein the first digital accumulator integrates the first value based on the first register in order to generate the position command.

12. The method as recited in claim 11, wherein the first value limits the velocity of the microactuator.

13. The method as recited in claim 10, wherein the first digital accumulator integrates the first value based on the first register in order to generate the velocity command.

14. The method as recited in claim 11, wherein the first value limits the acceleration of the microactuator.

15. The method as recited in claim 10, wherein the first digital accumulator comprises a counter comprising a step value based on the first register.

16. The method as recited in claim 10, wherein the disk comprises a plurality of tracks defined by embedded servo sectors and the method further comprises:
    processing the servo sectors at a servo sample rate; and
    clocking the first digital accumulator at least twice as fast as the servo sample rate.

17. The method as recited in claim 10, further comprising:
    configuring the first register in order to limit the velocity of the microactuator;
    configuring a second register of a second digital accumulator in order to limit the acceleration of the microactuator; and
    configuring the second digital accumulator to generate the velocity command for the microactuator.

18. The method as recited in claim 17, wherein:
    the second digital accumulator comprises a second counter comprising a second step value based on the second register; and
    the first digital accumulator comprises a first counter comprising a first step value based on an output of the second counter.

19. An integrated circuit operable to control a microactuator for actuating a head over a disk in a disk drive, the integrated circuit comprising a first digital accumulator responsive to a first register, wherein:
    the first digital accumulator is configured to generate at least one of a velocity command and a position command for the microactuator;
    the first register is configured to limit at least one of a velocity and an acceleration of the microactuator; and
    the first digital accumulator is configured to integrate a first value based on the first register.

* * * * *